UNITED STATES PATENT OFFICE.

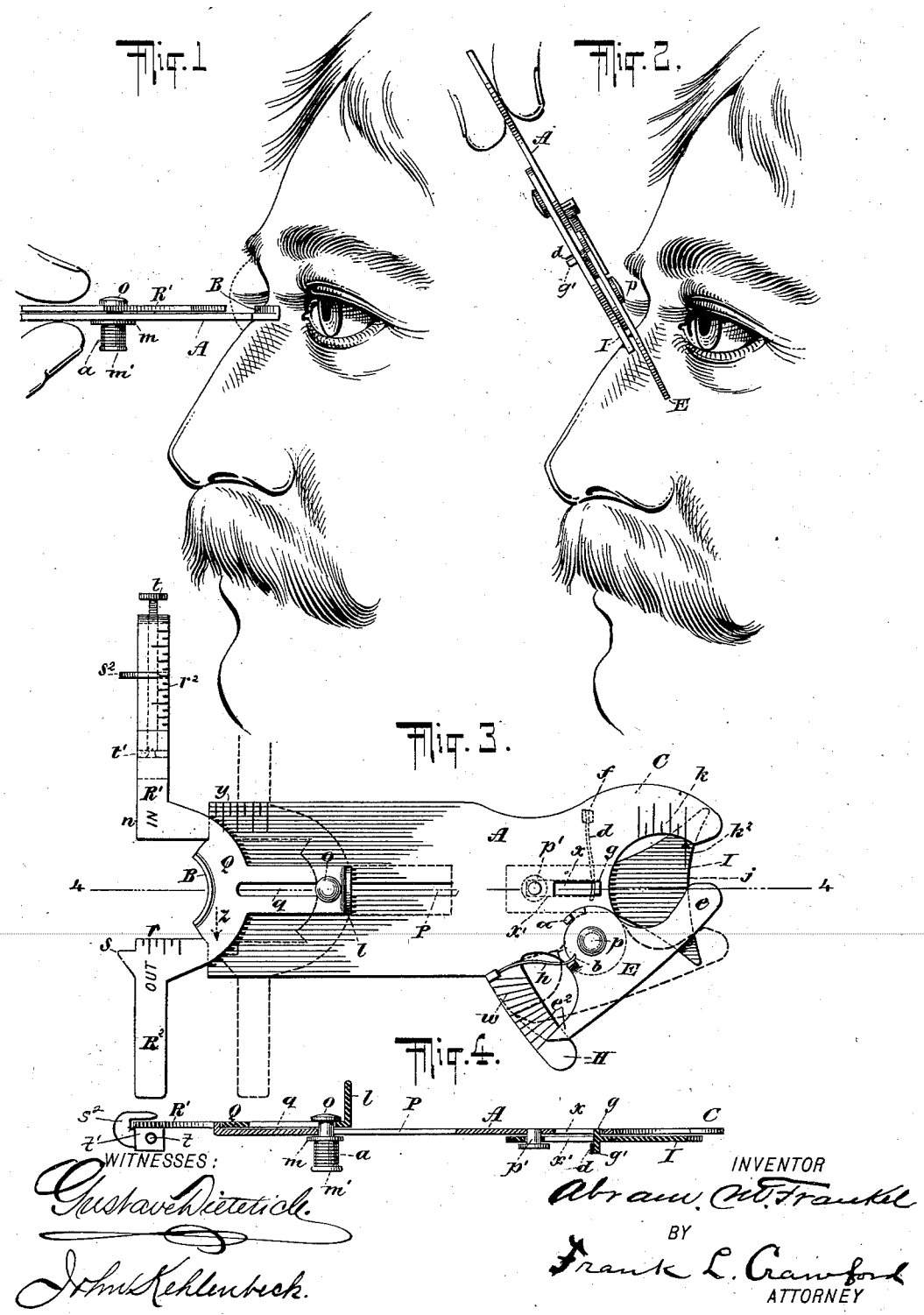

ABRAM M. FRANKEL, OF NEW YORK, N. Y.

NOSE-GAGE.

SPECIFICATION forming part of Letters Patent No. 663,165, dated December 4, 1900.

Application filed August 1, 1899. Serial No. 725,771. (No model.)

*To all whom it may concern:*

Be it known that I, ABRAM M. FRANKEL, of the borough of Manhattan, city of New York, and State of New York, have invented certain new and useful Improvements in Nose-Gages, of which the following is a specification.

My invention relates to improvements in nose-gages in which the various parts are adapted to measure the nose, so as to determine the measurements of spectacles or eyeglasses to fit the same.

The objects of my improvements are to provide in one compact instrument the parts of which coöperate with each other means for the various measurements which are necessary in order to determine the size and shape of the spectacle-bridge or eyeglass-guard and its angle of inclination to the plane of the glasses.

My invention is shown in the accompanying drawings, in which similar letters refer to similar parts throughout the several views.

Figure 1 represents a cross-section of a part of my device through the line 4 4 of Fig. 3, showing the same in use to determine the distance outward of the plane of the glass, as hereinafter set forth. Fig. 2 represents a cross-section of another part of my device through the line 4 4 of Fig. 3, showing the same in use to determine the width of the base and the height of the bridge of the nose. Fig. 3 represents a plan view of my invention. Fig. 4 represents a complete cross-section of my invention through the line 4 4 of Fig. 3.

In the drawings, A is a thin plate of metal or other suitably rigid material, having a projecting stationary arm C. E is a smaller plate pivoted on plate A at $p$. E is provided at one end with the arm $e$, which corresponds in shape to arm C. Pivot $p$ is so located and the arm $e$ is of such size as that when in use the extreme points of the arms $e$ and C will be equidistant from a point selected on the plate A—as, for example, the pivot $p^1$. The plate E is provided at the end opposite the arm $e$ with a pointed end $e^2$, which travels along the scale $w$ upon an arm H, projecting from and rigidly attached to plate A.

$h$ is a flat spring attached to one end of the plate H and with its other end taking against the shoulder $b$ in plate E. The pressure of the spring $h$ tends to make the plate E revolve in the direction of the arm C, and thereby creates a pressure against the sides of the nose, when the instrument is in use, so that the distance between the ends of the arms C and $e$ will measure accurately the width of the base of the nose. The ends of the arms C and $e$ are modeled to suit the shape of the base of the nose. The revolution of the plate E in the direction of the arm C is checked by the stop $a$, attached to the plate A.

Sliding on the pivot $p'$, attached to the under side of the plate A, is a plate I, of metal or other suitably rigid material, the shape of which may be varied; but it should be hollowed out at the edge $j$, so as to receive and approximately fit the bridge of the nose. The plate I is provided with a slot $x'$, by which the plate I moves back and forth upon the pivot $p'$. $d$ is a flat spring attached to the reverse side of the plate A at $f$, which takes against the stop $g'$, attached to the plate I at the end of the slot $x$, whereby when the plate I is pushed in the direction of the pivot $p'$ it meets the resistance of the spring $d$, so that the plate I will only be moved in the direction of the pivot $p'$ as the pressure on the edge $j$ makes necessary, so that when this pressure is released the plate I will return to its former position. The stop $g$, also attached to plate I, extends through the slot $x$ in plate A, so as to prevent the revolution of plate I.

$k$ is a scale upon the arm C, intended to mark the height of the bridge of the nose. This scale, as also a scale $w$ on the arm H and all other scales shown in the drawings and hereinafter described, may be based upon any suitable system—as, for example, the fractional parts of an inch or millimeters or other fractional measurements of the metric system. Upon the plate I is marked a line or arrow $k^2$, which registers upon the scale $k$ the distance which the plate I moves in the direction of the pivot $p'$ when the plate I is pushed inward by the pressure of the nose.

Q is a thin plate, of metal or other suitably rigid material, provided with the slot $q$, through which and through the slot P in the plate A the pivot $o$ passes, so that the plate Q can move freely back and forth from the edge B of the plate A to the inner end of the slot P. The pivot $o$ moves freely in the slot B, being held in place by the washer $m$. The stem of the pivot $o$ is preferably elongated, so as to receive the spiral spring $a$, held in place by the washer $m'$, which spiral spring gives a tension to the movement of the plate Q. At B the plate A is modeled or hollowed out to suit the general shape of the bridge of the nose. The central portion of the plate Q is cut out correspondingly, so as to fit against a raised lip on the edge of the plate A at B. The plate Q is provided with two projecting arms $R'$ and $R^2$. Upon one of these arms—as, for example, $R^2$—is a scale of measurement $r$, and upon the plate A is an arrow $z$, which registers upon the scale $r$ the distance which the crest of the bridge or eyeglass-guard should project outward from the plane of the glasses where the eyes recede. $y$ is a similar scale on the plate A, upon which the edge $n$ of the arm $R'$ similarly registers the distance inward from the plane of the glasses of the bridge or eyeglass-guard where the eyes are prominent.

$s$ is a stationary projecting point upon one of the arms of the plate Q—as, for example, the arm $R^2$. $s^2$ is a movable point which may be made to travel along the arm $R'$ in any suitable way, as by a set-screw $t$, pivoted at $t'$ and passing through a movable point $s^2$ and engaging with the same by means of a female screw cut on the interior surface of the aperture in point $s^2$, through which the set-screw passes in the usual manner. The object of the points $s$ and $s^2$, together with the set-screw just described, is to measure the pupilary distance or the distance between the pupils of the eyes, so as to determine where the center of the glasses should fall. Movable point $s^2$ indicates this distance upon the scale $r^2$ upon the arm $R'$.

I am aware that the device for measuring the pupilary distance is not new, and I do not claim it as part of my invention, and the same may be omitted from my improved nose-gage without affecting its usefulness, being shown here as attached to the nose-gage simply for convenience.

My improved nose-gage being placed with the edge $j$ of the plate I against the bridge of the nose, in the position shown in Fig. 2, is pressed downward until the points of the arms C and $e$ are stopped by the cheeks on either side of the base of the nose. The arrow $k^2$ will then indicate on the scale $k$ the height of the bridge of the nose. At the same time the plate E will revolve as the nose presses the arm $e$ to one side, and the pointed arm $e^2$ will indicate upon the scale $w$ the distance between the extremities of the arms C and $e$, which will be the width of the base of the nose. A convenient way of determining this measurement is to adjust the plate E so that when the pointed arm $e^2$ rests upon the first line of the scale $w$ the distance between the extremities of the arms C and $e$ shall be any arbitrarily-selected distance—as, for example, one-half an inch. Then by placing the lines on the scale at properly-graduated distances the arm $e$ as it revolves will indicate in succession five-eighths and any other fractional part of an inch. By reversing the nose-gage and resting the curved lipped end B of the plate A against the upper part of the bridge of the nose in a line with the pupils of the eyes, as shown in Fig. 1, the distance of the crest of the spectacle-bridge or eyeglass-guard outward or inward from the plane of the glasses may be registered, as hereinbefore indicated. The device described for measuring the pupilary distance, if it is desired to combine it with my improved nose-gage, is used in the ordinary manner.

Other suitable devices for graduating the pressure of the plate I and the movable arm $e$ may be employed instead of the flat springs $d$ and $h$.

Having described my invention, what I claim, and desire to secure by Letters Patent, is—

1. In a nose-gage, the plate A having the arm C, provided with scale $k$ and arm H provided with scale $w$; the plate E having the arms $e$ and $e^2$ pivoted on the plate A; in combination with the plate I movably attached to the plate A and with suitable means for regulating the movement of the arm $e$ and the edge $j$ of the plate I along the plate A, substantially as and for the purposes set forth.

2. In a nose-gage, the plate A having the arm C provided with scale $k$ and the arm H provided with the scale $w$; the plate E pivoted at $p$ on the plate A and having arms $e$ and $e^2$; in combination with the plate I movably attached to the plate A by means of a pivot $p'$ rigidly attached to plate A, the said plate I moving freely back and forth on said pivot by means of the slot $x'$, and being held in place by the head of the pivot $p'$, with the springs $d$ and $h$ for regulating the movement of the arm $e$, and the edge $j$ of the plate I along the plate A, substantially as and for the purposes set forth.

ABRAM M. FRANKEL.

Witnesses:
FRANK L. CRAWFORD,
WILLIAM T. RUSHFORD.